United States Patent
Ferro et al.

(10) Patent No.: US 10,904,730 B2
(45) Date of Patent: Jan. 26, 2021

(54) SYSTEMS AND METHODS FOR CORRECTING NETWORK CONNECTIVITY OF A CONNECTED DEVICE

(71) Applicant: Ademco Inc., Golden Valley, MN (US)

(72) Inventors: Philip Ferro, Setauket, NY (US); James Kern, East Islip, NY (US); Michael Landi, Farmingdale, NY (US); Alice DeBiasio, Smithtown, NY (US); Kaja Mohaideen Yousuff, Hauppauge, NY (US)

(73) Assignee: Ademco Inc., Golden Valley, MN (US)

( * ) Notice: Subject to any disclaimer, the term of this patent is extended or adjusted under 35 U.S.C. 154(b) by 106 days.

(21) Appl. No.: 15/981,618

(22) Filed: May 16, 2018

(65) Prior Publication Data
US 2018/0338342 A1 Nov. 22, 2018

Related U.S. Application Data

(60) Provisional application No. 62/507,912, filed on May 18, 2017.

(51) Int. Cl.
*H04W 4/70* (2018.01)
*H04W 84/12* (2009.01)

(52) U.S. Cl.
CPC ............ *H04W 4/70* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 8,316,438 B1 | 11/2012 | Bush et al. | |
| 9,510,380 B2 | 11/2016 | Ogawara | |
| 9,807,674 B1 | 10/2017 | Yu | |
| 2007/0027996 A1 | 2/2007 | Stewart | |
| 2012/0331156 A1* | 12/2012 | Colpitts | H04L 12/2818 709/227 |
| 2015/0071216 A1 | 3/2015 | Ilsar et al. | |
| 2015/0097689 A1* | 4/2015 | Logue | H04W 4/70 340/632 |

OTHER PUBLICATIONS extended European search report for corresponding EP patent application 18172986.4, dated Sep. 24, 2018.

* cited by examiner

*Primary Examiner* — Peter Chen
*Assistant Examiner* — Jeff Banthrongsack
(74) *Attorney, Agent, or Firm* — Fredrikson & Byron, P.A.

(57) ABSTRACT

Systems and methods for correcting network connectivity of a connected device are provided. Such systems and methods can include a mobile device determining whether the mobile device can connect to and communicate with a connected device, and the mobile device determining whether the mobile device is connected to a home network. When the mobile device cannot connect to and communicate with the connected device, but is connected to the home network, such systems and methods can include the mobile device transmitting or displaying messages documenting a troubleshooting process to restore the network connectivity between the mobile device and the connected device. Contents of the messages can be dependent on whether some or none of current network connectivity information related to a current network connection between the mobile device and the home network matches stored network connectivity information.

20 Claims, 2 Drawing Sheets

SYSTEMS AND METHODS FOR CORRECTING NETWORK CONNECTIVITY OF A CONNECTED DEVICE

CROSS REFERENCE TO RELATED APPLICATIONS

This application claims priority to U.S. Provisional Patent Application No. 62/507,912 filed May 18, 2017 and titled "SYSTEMS AND METHODS FOR AUTOMATICALLY DETECTING A CHANGE IN AN IDENTIFICATION NAME OR NUMBER OF A COMMUNICATION PATH CONNECTED TO AN INTERNET OF THINGS DEVICE AND UPDATING THE SAME." U.S. Application No. 62/507,912 is hereby incorporated herein by reference.

FIELD

The present invention relates generally to connected systems. More particularly, the present invention relates to systems and methods for correcting network connectivity of a connected device.

BACKGROUND

Many connected devices, such as IoT devices or security sensors, utilize Wi-Fi connectivity to gain access to connected systems and services. However, a connected device can enter a failure mode when a user makes a change to a home Wi-Fi network, such as installing a new router, a new access point, or the like, that results in a change to an identification name or number of the home Wi-Fi network, such as a service set identifier (SSID) of the home Wi-Fi network.

For example, when the user makes the change to the home Wi-Fi network, the connected device can enter the failure mode because the user fails to update the connected device in a corresponding manner, thereby causing the connected device to lose the Wi-Fi connectivity. Indeed, the user may usually access the connected device via a mobile application installed on a mobile device and may not independently identify a need to update the connected device. When in the failure mode, the connected device can fail to communicate via the home Wi-Fi network because the connected device does not know the identification name or number of the home Wi-Fi network and, thus, is not able to connect to the home Wi-Fi network. Therefore, the user may not be able to connect to the connected device via the mobile application when needed, thereby creating a poor user experience and an unfavorable view of services provided by the mobile application.

In view of the above, there is a continuing, ongoing need for improved systems and methods.

DETAILED DESCRIPTION

Figure 1:
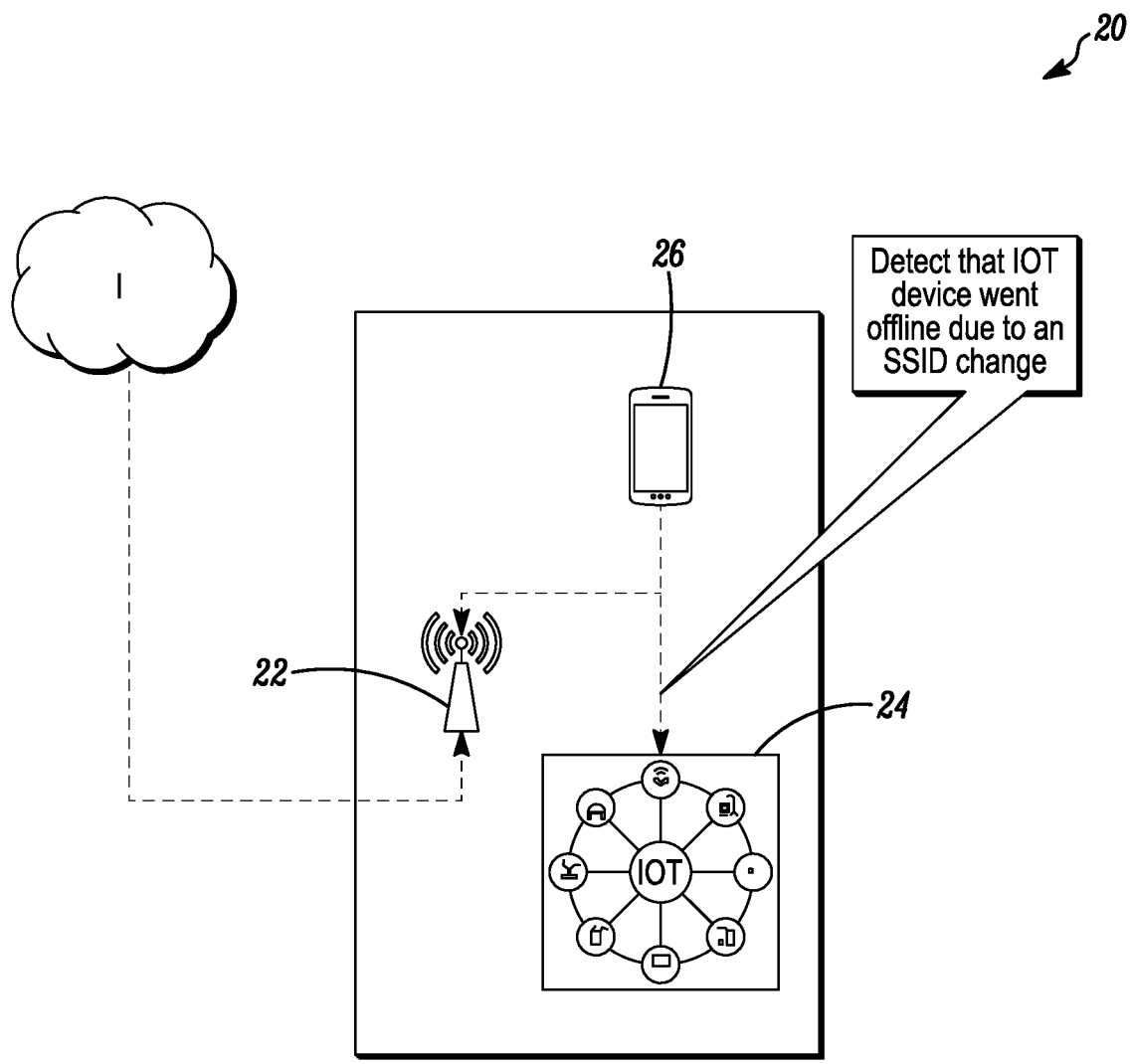
FIG. 1 is a block diagram of a connected system in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments disclosed herein can include systems and methods for correcting network connectivity of a connected device, an IoT device, a security system alarm panel, a security sensor, or any other Wi-Fi controllable device. Such systems and methods disclosed herein can include automatically detecting a change in an identification name or number of a communication path connected to the connected device and updating the same. For example, systems and methods disclosed herein can detect and notify a user when it is possible that a Wi-Fi environment may have changed and that an update to settings of the connected device may be required to rectify the connected device losing Wi-Fi connectivity due to such changes.

In accordance with disclosed embodiments, systems and methods disclosed herein can collect and recall data about any Wi-Fi network from which a mobile application is utilized or to which a mobile device is connected. Then, when one or more predetermined conditions are met, systems and methods disclosed herein can proactively notify a user of the same to facilitate the user or the system connecting the connected device to an appropriate Wi-Fi network.

For example, when the connected device is connected to a home Wi-Fi network and successfully communicates via the home Wi-Fi network, the connected device can transmit network connectivity information related to a home network connection between the connected device and the home network to a remote device for storage thereon. In some embodiments, the network connectivity information can include an identification name or number of the home Wi-Fi network, such as a SSID, and in some embodiments, the remote device can include a cloud network, a cloud server device, a cloud memory device, or a mobile device used to control the connected device.

When the connected device loses connectivity, either entirely or only via a primary communication path (e.g. Wi-Fi), for example, when a cellular backup communication path is available, and when the user accesses a mobile application installed on the mobile device through which the user accesses the connected device via the home Wi-Fi network or a second Wi-Fi network, systems and methods disclosed herein can identify such a connectivity loss. For example, in some embodiments, the cloud network or the cloud server device via which the connected device and the mobile device can communicate can identify that the mobile device cannot communicate with the connected device via the cloud network and, responsive thereto, notify the mobile device of the connectivity loss. Additionally or alternatively, in some embodiments, the mobile device can identify the connectivity loss by monitoring a communication path between the mobile device and the connected device and, responsive thereto, identify that the mobile device cannot communicate with the connected device.

Responsive to the connectivity loss, systems and methods disclosed herein can take one of several actions based on a current Wi-Fi network via which the mobile application is being accessed. For example, when the current Wi-Fi network to which the mobile device is connected matches the identification name or number of the home Wi-Fi network stored on the remote device, systems and methods disclosed herein can transmit one or more messages for display on the mobile device to document a troubleshooting process to restore the Wi-Fi connectivity of the connected device. In some embodiments, the trouble shooting process can include, for example, validating a password for the current/home Wi-Fi network and the like.

In some embodiments, when the current Wi-Fi network to which the mobile device is connected fails to match the identification name or number of the home Wi-Fi network stored on the remote device, systems and methods disclosed herein can transmit one or more messages for display on the mobile device to solicit confirmation as to whether the current Wi-Fi network to which the mobile device is connected should become the home Wi-Fi network. If so, then systems and methods disclosed herein can transmit one or more messages for display on the mobile device to notify the user that the identification name or number of the home Wi-Fi network has changed and that the connected device needs to be connected to the current Wi-Fi network. In some embodiments, systems and methods disclosed herein can also transmit one or more messages for display on the mobile device to document a process for connecting the connected device to the current Wi-Fi network. For example, in some embodiments, connecting the connected device to the current Wi-Fi network can include executing one or more integrated software applications on the mobile device and on the connected device to enter a local setup mode in the connected device that utilizes a local broadcasting signal from the connected device to which the mobile device can connect and that allows selection and configuration of the identification name or number for the current Wi-Fi network, now the home Wi-Fi network, thereby restoring the Wi-Fi connectivity for the connected device.

In some embodiments, when current Wi-Fi network to which the mobile device is connected fails to match the identification name or number of the home Wi-Fi network stored on the remote device and when the connected device loses connectivity via the primary communication path, but maintains connectivity via a backup cellular communication path, systems and methods disclosed herein can transmit one or more messages for display on the mobile device to solicit confirmation as to whether the current Wi-Fi should become the home Wi-Fi network. If so, then systems and methods disclosed herein can transmit one or more messages for display on the mobile device to notify the user that the identification name or number of the home Wi-Fi network has changed and that the connected device needs to be connected to the current Wi-Fi network. For example, in some embodiments, connecting the connected device to the current Wi-Fi network can include executing a software application on the mobile device to transmit the identification name or number of the current Wi-Fi network to the connected device via the backup cellular communication path, thereby restoring the Wi-Fi connectivity for the connected device and configuring of the identification name or number for the home Wi-Fi network via the mobile device without local programming access at the connected device. In some embodiments, systems and methods disclosed herein can solicit user input via the mobile device that includes a password for the current Wi-Fi network, and the mobile device can transmit the password with the identification name or number of the current Wi-Fi network to the connected device via the backup cellular communication path to facilitate the connected device connecting to the current Wi-Fi network.

It is to be understood that some systems and methods as disclosed herein can be implemented, executed, and controlled by the cloud network or the cloud server device that includes control circuitry, one or more programmable processors, and executable control software as would be understood by one of ordinary skill in the art. The executable control software can be stored on a transitory or non-transitory computer readable medium, including, but not limited to local computer memory, RAM, optical storage media, magnetic storage media, flash memory, and the like.

FIG. 1 is a block diagram of a system 20 in accordance with disclosed embodiments. The system 20 can include a router 22, a connected device 24, and a mobile device 26. The router 22 can create a local home network to which both the mobile device 26 and the connected device 24 can connect and through which the mobile device 26 and the connected device 24 can communicate with one other. In some embodiments, the router 22 can act as a gateway linking the local home network to an outside network, such as the internet I.

Figure 2:
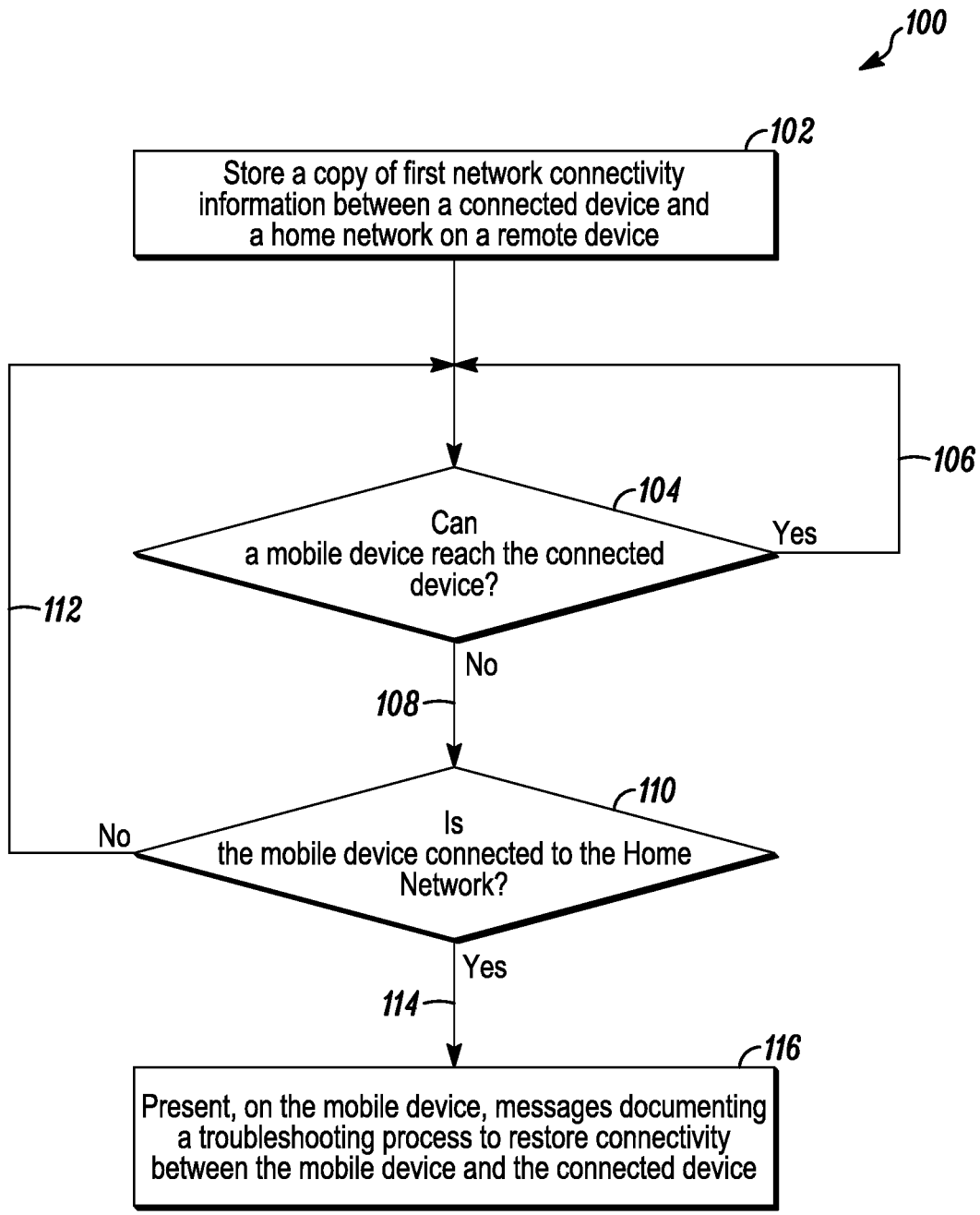
FIG. 2 is a flow diagram of a method in accordance with disclosed embodiments.

FIG. 2 is a flow diagram of a method 100 in accordance with disclosed embodiments. As seen in FIG. 2, the method 100 can include the connected device 24 transmitting network connectivity information related to a home network connection between the connected device 24 and the local home network created by the router 22 to a remote device for storage thereon, as in 102. In some embodiments, the network connectivity information can include a name of the local home network and a password used to securely join the local home network. In some embodiments, the remote device can include a cloud server device, and the network connectivity information can be transmitted via the internet I. Additionally or alternatively, in some embodiments, the remote device can include the mobile device 26.

As seen in FIG. 2, the method 100 can also include the mobile device 26 determining whether the mobile device 26 can connect to and communicate with the connected device 24, as in 104. For example, in some embodiments, a cloud network or the cloud server device via which the connected device 24 and the mobile device 26 can communicate can identify that the mobile device 26 cannot communicate with the connected device 24 via the cloud network and, responsive thereto, notify the mobile device 26 that the mobile device 26 cannot connect to and communicate with the connected device 24. Additionally or alternatively, in some embodiments, the mobile device 26 can identify that the mobile device 26 cannot connect to and communicate with the connected device 24 by monitoring a communication path between the mobile device 26 and the connected device 24. In any embodiment, the cloud network, the cloud server device, or the mobile device 26 can identify that the mobile device 26 cannot connect to and communicate with the connected device 24 by transmitting a ping or similar message to an assigned address of the connected device 24 and determining whether the cloud network, the cloud server device, or the mobile device 26 receives a response signal from the connected device 24 responsive thereto. Additionally or alternatively, the connected device 22 can continuously or periodically broadcast a beacon signal, and the cloud network, the cloud server device, or the mobile device 26 can determine whether the mobile device 26 can connect to and communicate with the connected device 24 based on whether or not the cloud network, the cloud server device, or the mobile device receives the beacon signal with a predetermined period of time.

When the mobile device 26 determines that the mobile device 26 can connect to and communicate with the connected device 24, as in 104, for example, when the mobile device 26 receives the response signal or the beacon signal from the connected device 24, the method 100 can include the mobile device 26 continuing to determine whether the mobile device 26 can connect to and communicate with the connected device 24, as in 106. Furthermore, in some embodiments, when the mobile device 26 determines that the mobile device 26 can connect to and communicate with the connected device 24, the mobile device 26 can transmit command signals to the connected device 24.

However, when the mobile device 26 determines that the mobile device 26 cannot connect to and communicate with the connected device 24, as in 104, the mobile device 26 can initiate further processes, as in 108. For example, as seen in FIG. 2, when the mobile device 26 determines that the mobile device 26 cannot connect to and communicate with the connected device 24, the method 100 can include the mobile device 26 determining whether the mobile device 26 is connected to the local home network, as in 110. In some embodiments, the mobile device 26 can determine that the mobile device 26 is connected to the local home network when an SSID of the network connectivity information stored on the remote device matches an SSID of a network to which the mobile device 26 is connected. For example, the mobile device 26 can retrieve the network connectivity information from either the cloud server or a memory of the mobile device and compare the SSID of the network connectivity information to the SSID of the network to which the mobile device 26 is connected. Additionally or alternatively, in some embodiments, the mobile device 26 can solicit user input indicative of whether the mobile device 26 is connected to the local home network and determine whether the mobile device 26 is connected to the local home network responsive thereto. Additionally or alternatively, in some embodiments, the mobile device 26 can solicit the user input only when the SSID of the network connectivity information stored on the remote device fails to match the SSID of the network to which the mobile device 26 is connected. In some embodiments, the user input can include instructions to configure the network to which the mobile device 26 is connected to be the local home network. When the mobile device 26 is not connected to the local home network, the mobile device 26 can continue attempting to connect to the connected device 24, as in 112. In some embodiments, the mobile device 26 can delay further action until the mobile device 26 is connected to the local home network.

However, when the mobile device 26 is connected to the local home network as originally configured or via the network to which the mobile device 26 is connected being configured to be the local home network, but the mobile device 26 cannot connect to and communicate with the connected device 24, as in 114, the mobile device 26 can transmit or display messages documenting a troubleshooting process to restore connectivity between the mobile device 26 and the connected device 24, as in 116. In some embodiments, the mobile device 26 can retrieve the messages from the cloud server.

Contents of the messages can depend on whether some or none of the network connectivity information stored on the remote device matches the network to which the mobile device 26 is connected. For example, when some of the network connectivity information stored on the remote device matches the network to which the mobile device 26 is connected, that is, the mobile device 26 is connected to the local home network as originally configured, the contents of the messages can include instructions for validating a password of the local home network used by the connected device 24. However, when none of the network connectivity information stored on the remote device matches the network to which the mobile device 26 is connected, that is, the network to which the mobile device 26 is connected is the local home network as newly configured, the contents of the messages can include instructions for connecting the connected device 24 to the network to which the mobile device 26 is connected and identifying that network as the local home network.

In some embodiments, the connected device 24 can include a backup communications device for communication via an independent network, separate from the local home network. For example, in some embodiments, the backup communications device can include a cellular radio. When the connected device 24 includes the backup communications device, the mobile device 26 can transmit the instructions for connecting the connected device 24 to the network to which the mobile device 26 is connected via the backup communications device.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
    determining whether a mobile device can connect to and communicate with a connected device via a current network to which the mobile device is connected;
    determining whether the current network is a home network or a remote network by comparing current network connectivity information for the current network to stored network connectivity information associated with the connected device;
    when the mobile device cannot connect to and communicate with the connected device and the current network is the home network, transmitting messages from the mobile device or displaying the messages on the mobile device, the messages documenting a troubleshooting process to restore connectivity between the mobile device and the connected device; and
    when the mobile device cannot connect to and communicate with the connected device and the current network is the remote network, continuing to determine whether the mobile device can connect to and communicate with the connected device and whether the current network is the home network or the remote network,
    wherein contents of the messages are dependent on whether some or none of the current network connectivity information matches the stored network connectivity information.

2. The method of claim 1 further comprising:
    retrieving the stored network connectivity information from a remote device that includes a cloud server; and
    determining whether the mobile device can connect to and communicate with the connected device responsive to a signal from the cloud server indicative of whether the mobile device can connect to and communicate with the connected device.

3. The method of claim 2 further comprising:
    retrieving the messages from the remote device.

4. The method of claim 1 further comprising:
retrieving the stored network connectivity information from a memory of the mobile device.

5. The method of claim 1 further comprising:
determining that the current network is the home network when a first service set identifier (SSID) of the current network connectivity information matches a second SSID of the stored network connectivity information.

6. The method of claim 1 further comprising:
soliciting user input indicative of whether the current network is the home network or the remote network;
receiving the user input; and
using the user input to determine whether the current network is the home network or the remote network.

7. The method of claim 6 further comprising:
soliciting the user input when a first service set identifier (SSID) of the current network connectivity information fails to match a second SSID of the stored network connectivity information.

8. The method of claim 1 wherein the contents of the messages include instructions for validating a password of the home network when some of the current network connectivity information matches the stored network connectivity information.

9. The method of claim 1 wherein the contents of the messages include instructions for connecting the connected device to the home network using the current network connectivity information when none of the current network connectivity information matches the stored network connectivity information.

10. The method of claim 9 further comprising:
transmitting the current network connectivity information to the connected device via a backup communications medium for connecting the connected device to the home network using the current network connectivity information.

11. A system comprising:
a router for managing a home network;
a connected device; and
a mobile device,
wherein the connected device stores first network connectivity information related to a home network connection on a remote device,
wherein the mobile device determines whether the mobile device can connect to and communicate with the connected device via a current network to which the mobile device is connected,
wherein the mobile device determines whether the current network is the home network or a remote network by comparing current network connectivity information for the current network to the first network connectivity information,
wherein, when the mobile device cannot connect to and communicate with the connected device and the current network is the home network, the mobile device transmits messages or displays the messages, the messages documenting a troubleshooting process to restore connectivity between the mobile device and the connected device,
wherein, when the mobile device cannot connect to and communicate with the connected device and the current network is the remote network, the mobile device continues to determine whether the mobile device can connect to and communicate with the connected device and whether the current network is the home network or the remote network, and
wherein contents of the messages depend on whether some or none of the current network connectivity information matches the first network connectivity information.

12. The system of claim 1 wherein the remote device includes a cloud server, and wherein the mobile device determines whether the mobile device can connect to and communicate with the connected device responsive to a signal from the cloud server indicative of whether the mobile device can connect to and communicate with the connected device.

13. The system of claim 12 wherein the mobile device retrieves the messages from the cloud server.

14. The system of claim 11 wherein the remote device includes a memory of the mobile device.

15. The system of claim 11 wherein the mobile device determines that the current network is the home network when a first service set identifier (SSID) of the first network connectivity information matches a second SSID of the current network connectivity information.

16. The system of claim 11 wherein the mobile device solicits user input indicative of whether the current network is the home network, receives the user input, and uses the user input to determine whether the mobile device is connected to the home network.

17. The system of claim 16 wherein the mobile device solicits the user input when a first service set identifier (SSID) of the first network connectivity information fails to match a second SSID of the current network connectivity information.

18. The system of claim 11 wherein the contents of the messages include instructions for validating a password of the home network when some of the current network connectivity information matches the first network connectivity information.

19. The system of claim 11 wherein the contents of the messages include instructions for connecting the connected device to the home network using the current network connectivity information when none of the current network connectivity information matches the first network connectivity information.

20. The system of claim 19 wherein the mobile device transmits the current network connectivity information to the mobile device via a backup communications medium, and wherein the connected device connects to the home network using the current network connectivity information.

* * * * *